(12) United States Patent
Nag et al.

(10) Patent No.: US 7,774,468 B1
(45) Date of Patent: Aug. 10, 2010

(54) NETWORK TRAFFIC ADMISSION CONTROL

(76) Inventors: Siddhartha Nag, 1 Tiberon Dr., Holmdel, NJ (US) 07733; Srikanth S. Kumar, 1211 Town Ct. North, Lawrenceville, NJ (US) 08648

( * ) Notice: Subject to any disclaimer, the term of this patent is extended or adjusted under 35 U.S.C. 154(b) by 925 days.

(21) Appl. No.: 11/038,445

(22) Filed: Jan. 18, 2005

Related U.S. Application Data

(63) Continuation-in-part of application No. 09/634,035, filed on Aug. 8, 2000, now Pat. No. 7,013,338, and a continuation-in-part of application No. 10/206,402, filed on Jul. 27, 2002, now Pat. No. 7,266,683, and a continuation-in-part of application No. 10/701,017, filed on Nov. 3, 2003.

(60) Provisional application No. 60/537,277, filed on Jan. 15, 2004, provisional application No. 60/221,571, filed on Jul. 28, 2000, provisional application No. 60/308,421, filed on Jul. 27, 2001, provisional application No. 60/423,189, filed on Nov. 1, 2002.

(51) Int. Cl.
*G06F 15/173* (2006.01)

(52) U.S. Cl. .................. 709/226; 709/224; 709/225

(58) Field of Classification Search ................ 370/230; 709/224, 225, 226
See application file for complete search history.

(56) References Cited

U.S. PATENT DOCUMENTS

| | | | |
|---|---|---|---|
| 5,394,522 A | 2/1995 | Sanchez-Frank et al. |
| 5,809,282 A | 9/1998 | Cooper et al. |
| 5,826,242 A | 10/1998 | Montulli |
| 5,831,975 A | 11/1998 | Chen et al. |
| 5,884,037 A | 3/1999 | Aras et al. |
| 5,903,735 A | 5/1999 | Kidder et al. |
| 5,958,009 A | 9/1999 | Friedrich et al. |
| 5,996,013 A | 11/1999 | Delp et al. |
| 6,009,469 A | 12/1999 | Mattaway et al. |

(Continued)

FOREIGN PATENT DOCUMENTS

EP 1017200 7/2000

(Continued)

OTHER PUBLICATIONS

Hwang, Junseok. A Market-Based Model for the Bandwidth Management of IntServ-DiffServ QoS Interconnection: A Network Economic Approach. 2000. pp. 1-204.*

(Continued)

*Primary Examiner*—John Follansbee
*Assistant Examiner*—Imad Hussain

(57) ABSTRACT

Methods and apparatus are provided for performing traffic admission control in a Differentiated Services (DiffServ) network environment. According to one embodiment, a predetermined portion of available bandwidth between a first network device and a second network device is reserved as a real-time bandwidth pool for real-time communication sessions among users of a first group of terminals associated with the first network device and a second group of terminals associated with the second network device, the real-time bandwidth pool corresponding to estimated bandwidth remaining available on a path through a Differentiated Services (DiffServ) network interposed between the first group of terminals and the second group of terminals. Thereafter, the real-time bandwidth pool is shared among multiple real-time communication sessions involving terminals of the first and second groups of terminals by selectively admitting application sessions based upon currently available resources in the real-time bandwidth pool.

33 Claims, 8 Drawing Sheets

U.S. PATENT DOCUMENTS

| | | | |
|---|---|---|---|
| 6,026,443 A | 2/2000 | Oskouy et al. | |
| 6,041,353 A | 3/2000 | Hirata et al. | |
| 6,046,981 A * | 4/2000 | Ramamurthy et al. | 370/232 |
| 6,054,987 A | 4/2000 | Richardson | |
| 6,061,723 A | 5/2000 | Walker et al. | |
| 6,092,113 A | 7/2000 | Maeshima et al. | |
| 6,104,721 A | 8/2000 | Hsu | |
| 6,108,310 A | 8/2000 | Wilkinson et al. | |
| 6,115,372 A * | 9/2000 | Dinha | 370/352 |
| 6,125,397 A | 9/2000 | Yoshimura et al. | |
| 6,154,465 A | 11/2000 | Pickett | |
| 6,208,638 B1 | 3/2001 | Rieley et al. | |
| 6,209,033 B1 | 3/2001 | Datta et al. | |
| 6,212,562 B1 | 4/2001 | Huang et al. | |
| 6,226,678 B1 | 5/2001 | Mattaway et al. | |
| 6,243,376 B1 | 6/2001 | Ng et al. | |
| 6,243,759 B1 | 6/2001 | Boden et al. | |
| 6,259,771 B1 | 7/2001 | Kredo et al. | |
| 6,298,120 B1 | 10/2001 | Civanlar et al. | |
| 6,301,229 B1 * | 10/2001 | Araujo et al. | 370/252 |
| 6,366,577 B1 | 4/2002 | Donovan et al. | |
| 6,370,154 B1 | 4/2002 | Wickham | |
| 6,377,546 B1 | 4/2002 | Guerin et al. | |
| 6,412,000 B1 | 6/2002 | Riddle et al. | |
| 6,418,139 B1 | 7/2002 | Akhtar et al. | |
| 6,442,615 B1 | 8/2002 | Nordenstam et al. | |
| 6,463,089 B1 | 10/2002 | Chauncey et al. | |
| 6,477,572 B1 | 11/2002 | Elderton et al. | |
| 6,490,249 B1 * | 12/2002 | Aboul-Magd et al. | 370/232 |
| 6,493,348 B1 | 12/2002 | Gelman et al. | |
| 6,499,027 B1 | 12/2002 | Weinberger | |
| 6,515,966 B1 | 2/2003 | Bardalai et al. | |
| 6,519,254 B1 | 2/2003 | Chuah et al. | |
| 6,549,940 B1 | 4/2003 | Allen et al. | |
| 6,570,867 B1 | 5/2003 | Robinson et al. | |
| 6,594,265 B1 * | 7/2003 | Etorre et al. | 370/395.51 |
| 6,594,268 B1 * | 7/2003 | Aukia et al. | 370/400 |
| 6,594,279 B1 * | 7/2003 | Nguyen et al. | 370/468 |
| 6,606,668 B1 | 8/2003 | MeLampy et al. | |
| 6,611,516 B1 | 8/2003 | Pirkola et al. | |
| 6,639,981 B1 | 10/2003 | Dunn, Jr. et al. | |
| 6,640,248 B1 | 10/2003 | Jorgensen et al. | |
| 6,643,258 B1 * | 11/2003 | Ise et al. | 370/230 |
| 6,647,208 B1 | 11/2003 | Kirby et al. | |
| 6,654,803 B1 | 11/2003 | Rochford et al. | |
| 6,667,968 B1 | 12/2003 | Tran | |
| 6,675,387 B1 | 1/2004 | Boucher et al. | |
| 6,678,729 B1 | 1/2004 | Ahoor et al. | |
| 6,680,943 B1 | 1/2004 | Gibson et al. | |
| 6,690,678 B1 * | 2/2004 | Basso et al. | 370/468 |
| 6,714,987 B1 | 3/2004 | Amin et al. | |
| 6,728,365 B1 * | 4/2004 | Li et al. | 379/329 |
| 6,738,383 B1 | 5/2004 | Kliland et al. | |
| 6,744,767 B1 | 6/2004 | Chiu et al. | |
| 6,775,701 B1 | 8/2004 | Pan et al. | |
| 6,798,786 B1 * | 9/2004 | Lo et al. | 370/468 |
| 6,804,224 B1 | 10/2004 | Schuster et al. | |
| 6,831,932 B1 | 12/2004 | Boyle et al. | |
| 6,870,845 B1 | 3/2005 | Bellovin et al. | |
| 6,909,708 B1 | 6/2005 | Krishnaswamy et al. | |
| 6,910,074 B1 | 6/2005 | Amin et al. | |
| 6,925,076 B1 | 8/2005 | Dalgic et al. | |
| 6,937,566 B1 | 8/2005 | Forslow | |
| 6,940,814 B1 | 9/2005 | Hoffman | |
| 6,977,896 B1 | 12/2005 | Kobayashi | |
| 6,985,957 B2 | 1/2006 | Fujita | |
| 7,013,338 B1 | 3/2006 | Nag et al. | |
| 7,016,375 B1 | 3/2006 | Rosenberg et al. | |
| 7,072,295 B1 * | 7/2006 | Benson et al. | 370/230 |
| 7,124,187 B1 * | 10/2006 | Kodialam et al. | 709/226 |
| 7,136,377 B1 | 11/2006 | Tweedly et al. | |
| 7,209,473 B1 | 4/2007 | Mohaban et al. | |
| 7,221,384 B2 | 5/2007 | Mueller et al. | |
| 7,221,662 B2 | 5/2007 | Koistinen et al. | |
| 7,266,683 B1 | 9/2007 | Nag | |
| 7,266,832 B2 | 9/2007 | Miller | |
| 7,269,657 B1 * | 9/2007 | Alexander et al. | 709/229 |
| 7,274,662 B1 * | 9/2007 | Kalmanek et al. | 370/230 |
| 7,280,528 B1 | 10/2007 | Polit et al. | |
| 7,305,000 B2 | 12/2007 | Horiba | |
| 7,606,146 B1 | 10/2009 | Pan et al. | |
| 2002/0015387 A1 | 2/2002 | Houh | |
| 2002/0030696 A1 | 3/2002 | Twinkwalder et al. | |
| 2002/0049841 A1 * | 4/2002 | Johnson et al. | 709/225 |
| 2002/0049860 A1 | 4/2002 | Koistinen | |
| 2002/0120741 A1 * | 8/2002 | Webb et al. | 709/225 |
| 2002/0152305 A1 * | 10/2002 | Jackson et al. | 709/224 |
| 2002/0174227 A1 * | 11/2002 | Hartsell et al. | 709/226 |
| 2002/0188720 A1 * | 12/2002 | Terrell et al. | 709/225 |
| 2002/0199012 A1 * | 12/2002 | Cable et al. | 709/233 |
| 2003/0026423 A1 | 2/2003 | Unger et al. | |
| 2003/0028535 A1 | 2/2003 | Sheldon et al. | |
| 2003/0046396 A1 * | 3/2003 | Richter et al. | 709/226 |
| 2003/0053463 A1 * | 3/2003 | Vikberg et al. | 370/395.1 |
| 2003/0091049 A1 * | 5/2003 | Abe et al. | 370/392 |
| 2003/0126287 A1 * | 7/2003 | Charny et al. | 709/239 |
| 2003/0219029 A1 | 11/2003 | Pickett | |
| 2004/0039820 A1 * | 2/2004 | Colby et al. | 709/226 |
| 2004/0057435 A1 | 3/2004 | Ruyle et al. | |
| 2004/0073641 A1 | 4/2004 | Minhazuddin et al. | |
| 2004/0172464 A1 | 9/2004 | Nag | |
| 2004/0205239 A1 * | 10/2004 | Doshi et al. | 709/241 |
| 2005/0044161 A1 | 2/2005 | Fujita | |
| 2005/0083842 A1 * | 4/2005 | Yang et al. | 370/230 |
| 2005/0128951 A1 * | 6/2005 | Chawla et al. | 370/235 |
| 2005/0138204 A1 | 6/2005 | Iyer et al. | |
| 2005/0198261 A1 | 9/2005 | Durvasula et al. | |
| 2005/0210292 A1 | 9/2005 | Adams et al. | |
| 2006/0020694 A1 | 1/2006 | Nag et al. | |
| 2006/0056298 A1 | 3/2006 | Nag et al. | |
| 2007/0168517 A1 * | 7/2007 | Weller et al. | 709/226 |
| 2009/0296734 A1 | 12/2009 | Nag | |

FOREIGN PATENT DOCUMENTS

| | | |
|---|---|---|
| WO | 0077988 | 12/2000 |
| WO | WO-0105115 | 1/2001 |
| WO | 0131939 | 5/2001 |
| WO | 0213023 | 2/2002 |
| WO | 0217036 | 2/2002 |

OTHER PUBLICATIONS

Kim, Jin-Cheol and Lee, Young-Hee. A Dynamic Admission Control Scheme in a DiffServ Domain. 2002. pp. 183-187 (1-5).*

Siler, Matthew and Wairand, Jean. Measurement-Based Admission Control and Monitoring for Statistical Rate-Latency Guarantees. Dec. 1999. Proceedings of the 38th Conference on Decision & Control. pp. 4426-4431 (1-6).*

Almesberger, Werner; Ferrari, Tiziana; Le Boudec, Jean-Yves. Scalable Resource Reservation for the Internet. 1997. IEEE. pp. 18-27 (1-10).*

Author Unknown., "HPSR 2002 Technical Program." http://www.ieice.org/hpsr2002/detail.html. 2003; pp. 1-8.

Author Unknown., "MeraVoice over IP Solutions, VOIP Technology and Product: VoIP Glossary." http://www.mera-voip.com/support/glossary.php. 2003; pp. 1-6.

Author Unknown., "Entities." http://ai3.asti.dost.gov.ph/h.323/entities.htm.2003; pp. 1-6.

Author Unknown., "CISCO IOS Software Release 12.0 T." http://www.cisco.com/en/US/products/sw/iosswrel/ps1830/products. 2003; pp. 1-12.

Author Unknown., "The drivers for Voice over IP." http://www.voip-calculator.com/drivers.html. 2003; pp. 1-3.

Author Unknown., "Voice over IP Protocols for Voice Transmission." http://voip-calculator.com/protocols.html. 2003; pp. 1-6.
Author Unknown., "H.323 Primer—an Introduction to H.323." http://voip-calculator.com/h323primer.html. 2003; pp. 1-5.
Author Unknown., "*Administrivia; Last Time; Endpoint Admission Control Paper; This paper: Explore Tradeoffs for This Type of Solution.*" Suny-Binghamton. 2003; Lecture #24.
Author Unknown., "DiffServ—*The Scalable End-to End QoS Model.*" Cisco Systems. 2001; pp. 1-19.
Author Unknown., "Implementing DiffServ for End-to-End Quality of. Service." Cisco IOS Release 12.1(5)T. pp. 1-22.
Author Unknown., "Low Latency Queueing." Cisco IOS Release 12.0(26)S. pp. 1-14.
Blake, S. et al., "An Architecture for Differentiated Services." The Internet Society. http://www.ietf.org/rfc/rfc2475.txt. 1998. pp. 1-34.
Blefari-Melazzi, N., et al., "Charging IP Network Services in a DiffServ Environment."
Jamalipour, A. et al., "Next-Generation Broadband Wireless Networks and navigation Services." Guest Editorial. http://www.comsoc.org/livepubs/ci1/Public/2002/Feb/gstedjamal.html. 2003; pp. 1-4.
Roaten., B., "IP telephony and EIC a Technical Overview." Interactive Intelligence. 1998; pp. 1-8.
Tewari, M., et al. "A New Call Admission Control Scheme for Real-Time Traffic in Wireless Networks." 2003.
Lee, K.; "Adaptive network support for mobile multimedia", 1.sup.st Annual International Conference on Mobile Computing and Networking, ISBN 0897918142, 1945, 13 pages.
Terzis, A. et al.; "Reservations for aggregate traffic: experiences from an RSVPtunnels implementation", 1998 Sixth 6. sup.th International Workshop on Quality of Service (IWQoS), ISBN 0780344820, 1998, 3 pages.
Terzis, A. et al.; Request for Comments (RFC) 2746, "RSVP Operation Over IP Tunnels", Jan. 2000, 25 pages.
Eder, M., et al., "Service Management Architectures Issues and Review," Jan. 2001, printed from Internet at: ftp://ftp.isi.edu/in-notes/rfc3052.txt (12 pages).
Eder, M., et al., "IP Service Management in the QoS Network," Nov. 2001, printed from Internet at: http://search.ietf.org/internet-drafts/draft-irft-smrg-ipsmf-01.txt (15 pages).
"Management Software—IP Telephony Management Solutions—Overview and Features"; 2004; Hewlett-Packard; printed from Internet at http://www.openview.hp.com/cgi-bin/pf-new.cgi?IN=hp//products/nnm/prod_nnm_0002.html; 1 page.
Muller; "Improving and Managing Multimedia Performance over TCP/IP Nets"; International Journal of Network Management; vol. 8; 1998; pp. 356-367.
Greenstein; "Transporting Voice Traffic Over Packet Networks"; International Journal of Network Management; vol. 8; 1998 pp. 227-234.
"Cisco Network Management"; downloaded from http://www.cisco.com/warp/public/44/jump/network_management.shtml on Sep. 13, 2000; 5 pages.
Kankkunen, et al.; "VoIP over MPLS Framework Internet Draft"; Internet Engineering Task Force; 2000; retrieved from Internet: http://tools.ietf.org/html/draft-kankkunen-vompls-fw-01; 58 pages.
Baker, et al.; "Aggregation of RSVP for IPv4 and IPv4 and IPv6 Reservations"; Sep. 2001; retrieved from http://ietf.org/rfc/rfc3175.txt?number=3175; 34 pages.
Braden, et al.; "RFC2205—Resource Reservation Protocol (RSVP)—Version 1 Functional Specification"; retrieved from Internet: http://www.faqs.org/rfcs/rfc2205.html; Sep. 1997; 79 pages.
Zhu, et al.; "RFC 2190—RTP Payload Format for H.263 Video Streams"; retrieved from Internet: http://faqs.org/rfcs/rfc2190.html; Sep. 1997; 10 pages.
Handley, et al.; "SIP: Session Initiated Protocol"; retrieved from Internet: http://ftp.isi.edu/in-notes/rfc2543.txt; Mar. 1999; 143 pages.
"SIP: Session Initiation Protocol"; Aug. 2004; retrieved from Internet: http://www.cs.columbia.edu/sip; 1 page.
"SIP: Session Initiation Protocol—Implementations—News"; retrieved from Internet: http://www.cs.columbia.edu/sip/news.html; 4 pages.
"Measures network performance and predicts the impact of changes"; Chariot; 2004; NetIQ Corporation; 2 pages.
"NetIQ: Chariot"; 1993-2004; NetIQ Corporation; retrieved from Internet: http://www.netiq.com/products/chr/default.asp?print=true; 1 page.
"Delivers comprehensive service management for Windows, UNIX and Linux systems and applications"; NetIQ AppManager Suite; 2004; NetIQ Corporation; 4 pages.
"Delivers Enterprise VoIP QoS and Management"; AppManager for VoIP; 2004; NetIQ Corporation; 4 pages.
"NetIQ's VoIP Management Solution"; 2004; NetIQ Corporation; 2 pages.
"NetIQ: AppManager for VoIP"; 1993-2004; NetIQ Corporation; retrieved from Internet: http://www.netiq.com/products/am/modules/voip.asp?print=true; 1 page.
Pearsall, et al.; "Doing a VoIP Assessment with Vivinet Assessor"; NetIQ Work Smarter; 2001-2002; NetIQ; 20 pages.
"Delivers the leading software solution for assessing a data network's readiness for VoIP"; Vivinet Assessor; NetIQ Corp.; 2004; 2 pages.
"Vivinet Assessor"; NetIQ; retrieved from Internet at http://www.netiq.com/products/va/default.asp?print=true; 1993-2004; 1 page.
"Pinpoints VoIP quality problems in minutes"; Vivinet Diagnostics; NetIQ Corporation; 2004; 2 pages.
"NetIQ: Vivinet Diagnostics"; NetIQ Corporation; retrieved from Internet: http://www.netiq.com/products/vd/default.asp?print=true; 1993-2004; 1 page.
"NetIQ: VoIP Management Solution"; NetIQ Corporation; 1993-2004; retrieved from Internet: http://www.netiq.com/solutions/voip/default.asp?print=true; 1 page.
"Micromuse: Products and Solutions—Netcool Suite Overview"; Micromuse, Inc.; 2004; printed from Internet: http://www.micromuse.com/products_sols/index.html; 9 pages.
"Netcool Solutions for Voice Over IP: Realtime Service Quality Management for IP Telephony Services"; Micromuse, Inc.; not dated; 5 pages.
"Netcool Solutions for Enterprise: End-to-End Business and Service Assurance"; Micromuse, Inc.; 7 pages; not dated.
"Netcool/System Service Monitors White Paper: Including Netcool/Applications Service Monitors"; 2003; Micromuse, Inc.; 8 pages.
"Netcool/Monitors Product Family—Realtime and Trended Performance, Status and Service Monitoring"; 2004; Micromuse, Inc.; 4 pages.
"Netcool/Usage Service Monitors White Paper (Netcool/USMs)"; 2003; Micromuse, Inc.; 11 pages.
"Netcool/Precision for IP Networks: Discovery and Topology-Based RCA"; Micromuse, Inc.; 2 pages.
"Realtime Event Management for Business and Service Assurance"; Micromuse, Inc.; 4 pages; not dated.
Farrell; "Grappling with Management of IP Telephony"; Internet Telephony; May 2004; 2 pages.
"NetIQ VoIP Manager Connector for Netcool/OMNIbus"; Micromuse, Inc.; 1 page; not dated.
Allen; "Putting new service management tactics to work: Service providers can make smarter use of service management technology"; ServerWorld; vol. 16, No. 4; Apr. 2002; 3 pages.
"HP OpenView Network Services Management—Business Blueprint"; HP Development Company; 2004; 6 pages.
"Management Software—Alliance with Cisco Systems, Inc."; 2004; Hewlett-Packard Development Company, L.P.; printed from Internet at http://www.openview.hp.com/cgi-bin/pf-new.cgi?IN=ho//products/nnm/prod_nnm_0002.html; 1 page.
"Smart Way 2004"; Cisco Systems and Hewlett-Packard; 2004; 4 pages.
"HP OpenView: Network Node Manager Smart Plug-in for Advanced Routing 1.0"; Data sheet; 2003-2004; Hewlett-Packard Development Company, L.P.; 4 pages.
"HP OpenView Performance Insight Report Pack for IP Telephony 1.2"; 2004; Hewlett-Packard Development Company, L.P.; 8 pages.
"HP OpenView glanceplus and glanceplus pak product brief"; 2003, Hewlett-Packard; 6 pages.

"HP OpenView Performance Manager, Performance Monitor and Performance Agent data sheet"; 2003; Hewlett-Packard Development Company, L.P.; 4 pages.

"HP OpenView Service Quality Manager 1.1 data sheet"; Hewlett-Packard Development Company, L.P.; 2003; 4 pages.

"HP OpenView service information portal 3.1 product brief"; Hewlett-Packard; 2003; 4 pages.

"HP OpenView problem diagnosis 1.1 product brief"; Hewlett-Packard; 2002; 4 pages.

"HP OpenView Performance Insight Report Pack for Infrastructure Usage"; 2004; Hewlett-Packard; 6 pages.

"HP OpenView Customer Views 1.4 for Network Node Manager data sheet"; Hewlett-Packard Development Company; 2003; 4 pages.

"Hewlett-Packard OpenView—About Hewlett-Packard OpenView"; Hewlett-Packard Development Company; 2004; printed from Internet at http://www.managementsoftware.hp.com/cgi-bin/pf-new.cgi?IN=hp//about/index.html; 2 pages.

"HP OpenView service quality manager product overview"; Hewlett-Packard Development Company; 2003; 17 pages.

"Intelligent Diagnostics for Networks—Beyond Root-Cause Analysis—A white paper from HP—preliminary"; Hewlett-Packard Development Company; 2003; 13 pages.

"HP OpenView Operations 7.x for Windows—Firewall Configuration white paper, Version 2.2"; Aug. 2003; Hewlett-Packard; 61 pages.

"Gain strategic advantage with HP IT Service Management—white paper"; Hewlett-Packard; 2003; 9 pages.

Harbaum, et al.; "Layer 4+ Switching with QOS Support for RTP and HTTP"; Global Telecommunications Conference 1999; pp. 1591-1596.

"AdventNet Products"; AdventNet; downloaded from http://a1132.g.akamai.net/7/1132/1581/1382cd01af18b6/www.adventnet.com/products.html; downloaded on Sep. 13, 2000; 2 pages.

"Network Node Manager"; HP OpenView; downloaded from http://www.openview.hp.com/products/nnm on Sep. 13, 2000; 2 pages.

"Network Node Manager Interactive Demos"; downloaded from http://ovwebl.external.hp.com/nnminteract on Sep. 13, 2000; 2 pages.

"Non Final Office Action", U.S. Appl. No. 11/183,156, (Jul. 27, 2009),33 pages.

Aggarwal, Alok et al., "Efficient Routing in Optical Networks", Journal of the ACM. vol. 43, Issue 6. ACM Press. Nov. 1996.,(Nov. 1996),973-1001.

Maxemchuk, N "Applying packet techniques to cellular radio", Wireless Networks. vol. 5, Issue 6. Dec. 1999. Kluwer Academic Publishers.,(Dec. 1999),519-536.

"Non-Final Office Action", U.S. Appl. No. 09/634,035, (Mar. 26, 2004),16 pages.

"Final Office Action", U.S. Appl. No. 09/634,035, (Nov. 8, 2004),26 pages.

"Notice of Allowance", U.S. Appl. No. 09/634,035, (Jul. 22, 2005),6 pages.

"NetIQ Vivinet Assessor", *Printed from the Internet at* http://www.netiq.com/products/va/default.asp?print=true, 1993-2004 NetIQ Corporation, 1 page.

"Netcool Monitors Product Family Realtime and Trended Performance", *Status and Service Monitoring*, Micromuse Inc,(2004),4 pages.

"Management Software Alliance with Cisco Systems Inc", *Printed from the internet at* http://www.openview.hp.com/cgi-bin/pf-new.cgi?IN=hp//partners/alliance/pall 0001.html, Hewlett-Packard Development Company LP,(2004),2 pages.

"HP OpenView", Network Node Manager Smart Plug-in for Advance Routing 1.0 Data Sheet, 2003-2004, Hewlett-Packard Development Company LP,4 pages.

"Final Office Action", U.S. Appl. No. 11/267,922, (May 14, 2009),14 pages.

"Non Final Office Action", U.S. Appl. No. 11/267,922, (Sep. 22, 2008),10 pages.

"Voice over IP Protocols for Voice Transmission", Retrieved from http://voip-calculator.com/protocols.html, 2003,6 pages.

"Advisory Action", U.S. Appl. No. 09/689,222, (Mar. 22, 2005),3 pages.

"Advisory Action", U.S. Appl. No. 09/689,222, (Jun. 05, 2006),3 pages.

"Final Office Action", U.S. Appl. No. 09/689,222, (Nov. 10, 2004),12 pages.

"Final Office Action", U.S. Appl. No. 09/689,222, (Jul. 26, 2005),7 pages.

"Final Office Action", U.S. Appl. No. 09/689,222, (Jul. 31, 2008),8 pages.

"Non Final Office Action", U.S. Appl. No. 09/689,222, (Feb. 9, 2004),13 pages.

"Non Final Office Action", U.S. Appl. No. 09/689,222, (Jan. 30, 2008),10 pages.

"Non Final Office Action", U.S. Appl. No. 09/689,222, (Jul. 25, 2008),10 pages.

"Non Final Office Action", U.S. Appl. No. 09/689,222, (Jan. 27, 2009),9 pages.

"Restriction Requirement", U.S. Appl. No. 09/689,222, (Apr. 5, 2005),5 pages.

"Notice of Allowance", U.S. Appl. No. 10/701,017, (Mar. 6, 2009),6 pages.

"Notice of Allowance", U.S. Appl. No. 10/701,017, (Nov. 14, 2008),9 pages.

"Notice of Allowance & Examiner Amendment with Allowed Claims", U.S. Appl. No. 10/701,017, (Jul. 2, 2008), 17 pages.

"Non-Final Office Action", U.S. Appl. No. 10/701,017, (Aug. 24, 2005),11 pages.

"Non Final Office Action", U.S. Appl. No. 10/206,402, (Feb. 8, 2006),22 pages.

"Non Final Office Action", U.S. Appl. No. 10/206,402, (Sep. 14, 2006),8 pages.

"Non Final Office Action", U.S. Appl. No. 10/206,402, (Apr. 12, 2007),7 pages.

"Notice of Allowance", U.S. Appl. No. 10/206,402, (Jun. 21, 2007),20 pages.

"International Search Report", International Application No. PCT/US2001/024878, (Dec. 19, 2001),3 pages.

"International Search Report", International Application Serial No. PCT/US2003/035024, (May 28, 2004), 4 pages.

"European Search Report", Application No. EP03768594, (Mar. 24, 2006),2 pages.

"Allowed Claims", U.S. Appl. No. 10/701,017, (Mar. 6, 2009),4 pages.

"International Search Report", International Application No. PCT/US2006/016094, (Aug. 22, 2007), 3 pages.

"Non Final Office Action", U.S. Appl. No. 11/409,661, (Oct. 24, 2008), 11 pages.

"Final Office Action", U.S. Appl. No. 11/409,661, (Jul. 24, 2009), 20 pages.

"Non-Final Office Action", U.S. Appl. No. 11/267,922, (Oct. 7, 2009), 15 pages.

"Advisory Action", U.S. Appl. No. 11/409,661, (Oct. 13, 2009), 3 pages.

"Notice of Allowance", U.S. Appl. No. 10/701,017, (Oct. 26, 2009), 4 pages.

"Notice of Allowance", U.S. Appl. No. 10/701,017, (Dec. 31, 2009), 4 pages.

"Final Office Action", U.S. Appl. No. 11/183,156, (Feb. 3, 2010),13 pages.

"Final Office Action", U.S. Appl. No. 11/267,922, (Feb. 26, 2010),19 pages.

"Final Office Action", U.S. Appl. No. 09/689,222, (Nov. 10, 2009), 7 pages.

"Notice of Allowance", U.S. Appl. No. 09/689,222, (Jan. 27, 2010), 6 pages.

"Notice of Allowance", U.S. Appl. No. 10/701,017, (Apr. 6, 2010), 4 pages.

"Advisory Action", U.S. Appl. No. 11/183,156, (Apr. 30, 2010), 3 pages.

"Notice of Allowance", U.S. Appl. No. 09/689,222, (Jun. 15, 2010),17 pages.

* cited by examiner

NETWORK TRAFFIC ADMISSION CONTROL

This application claims the benefit of Provisional Application No. 60/537,277, filed Jan. 15, 2004, the entirety of which is hereby incorporated herein by reference for all purposes. The present application is a Continuation-in-Part of U.S. patent application Ser. No. 09/634,035, now U.S. Pat. No. 7,013,338, filed Aug. 8, 2000 and entitled "Multiplexing Several Individual Application Sessions Over a Pre-Allocated Reservation Protocol Session", the entirety of which is hereby incorporated herein by reference for all purposes. U.S. Pat. No. 7,013,338 claims the benefit of U.S. Provisional Application No. 60/221,571, filed Jul. 28, 2000. The present application is also a Continuation-in-Part of U.S. patent application Ser. No. 10/206,402, now U.S. Pat. No. 7,266,683, filed Jul. 27, 2002 and entitled "Selective Encryption of Application Session Packets", the entirety of which is hereby incorporated herein by reference for all purposes. U.S. Pat. No. 7,266,683 claims the benefit of U.S. Provisional Application No. 60/308,421, filed Jul. 27, 2001. The present application is also a Continuation-in-Part of U.S. patent application Ser. No. 10/701,017, filed Nov. 3, 2003 and entitled "End-to-End Service Quality for Latency-Intensive Internet Protocol (IP) Applications in a Heterogeneous, Multi-Vendor Environment", the entirety of which is hereby incorporated herein by reference for all purposes. U.S. patent application Ser. No. 10/701,017 claims the benefit of U.S. Provisional Application No. 60/423,189, filed Nov. 1, 2002.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2000-2005 Prominence Networks, Inc.

BACKGROUND

1. Field

Embodiments of the present invention relate generally to a traffic admission control methodology for a Differentiated Services (DiffServ) network environment. More particularly, embodiments of the present invention relate to a scalable model for determining whether to grant admission to a voice, video and/or data traffic session using a combination of global path admission control and local traffic session admission control.

2. Description of the Related Art

Edge devices cannot currently obtain visibility into available bandwidth in all intermediate routers in a path to another edge device in a DiffServ network environment. Internet Protocol (IP) networks do not offer any mechanism to query the available bandwidth on a certain path through the network. Consequently, there is no available model for performing strict session admission control for new sessions desiring access to a path between two edge boxes in a DiffServ network environment.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

SUMMARY

Figure 1:
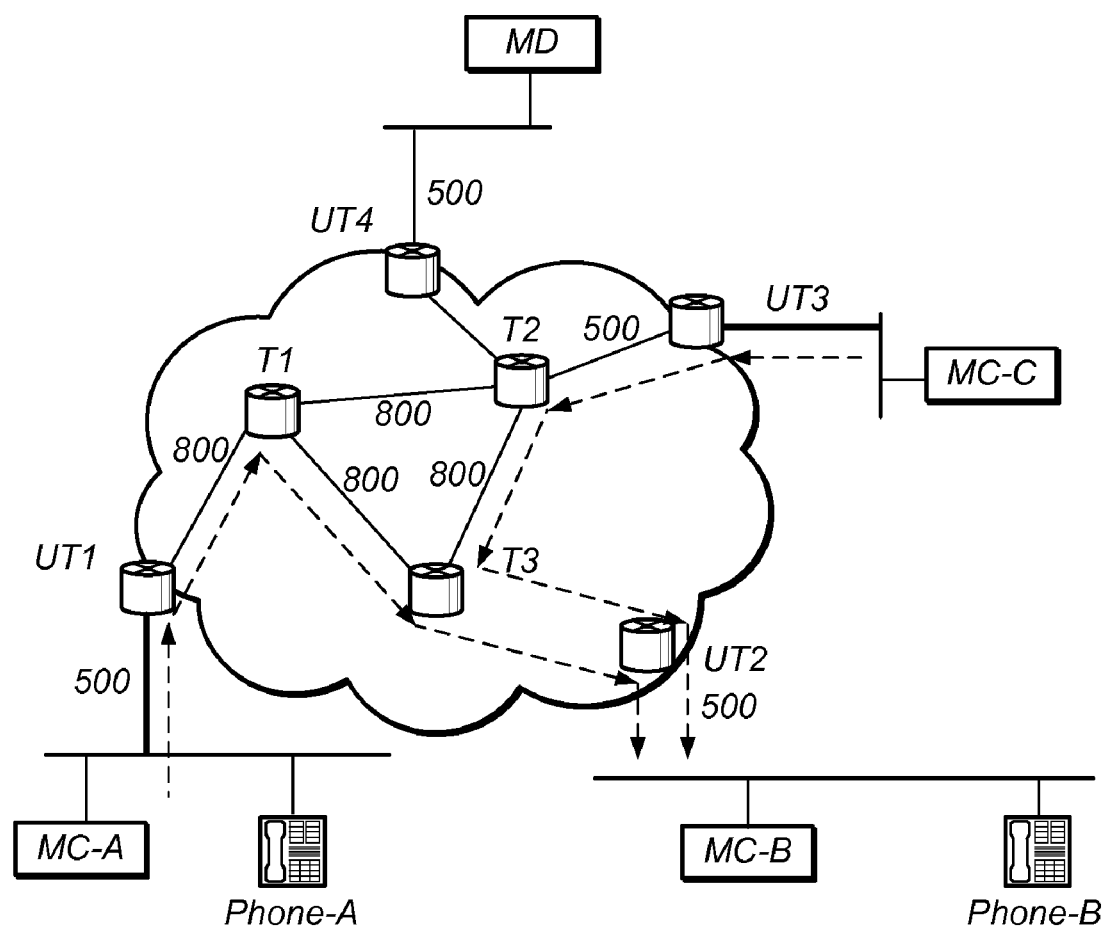
FIG. 1 conceptually illustrates an exemplary topology and network environment in which one embodiment of the present invention may be employed.

Methods and apparatus are described for performing traffic admission control in a Differentiated Services (DiffServ) network environment. According to one embodiment, a predetermined portion of available bandwidth between a first network device and a second network device is reserved as a real-time bandwidth pool for real-time communication sessions among users of a first group of terminals associated with the first network device and a second group of terminals associated with the second network device, the real-time bandwidth pool corresponding to estimated bandwidth remaining available on a path through a Differentiated Services (DiffServ) network interposed between the first group of terminals and the second group of terminals. Thereafter, the real-time bandwidth pool is shared among multiple real-time communication sessions involving terminals of the first and second groups of terminals by selectively admitting application sessions based upon currently available resources in the real-time bandwidth pool.

Other features of embodiments of the present invention will be apparent from the accompanying drawings and from the detailed description that follows.

DETAILED DESCRIPTION

Apparatus and methods are described for performing admission control in a DiffServ network environment. Broadly stated, embodiments of the present invention seek to provide a scalable model for determining whether to grant admission to a media session onto a path between edge devices of a DiffServ network environment. According to one embodiment, the unique model employs a combination of global path admission control and local traffic session admission control. For example, in the context of a Voice over IP (VoIP) implementation, a media director may maintain an up-to-date table of available bandwidth on every interface in the network and perform global path admission control (e.g., allocate bandwidth along a path through one or more DiffServ network domains) on behalf of local media aggregation managers. The local media aggregation managers then need only concern themselves with performing local call admission control based upon the pre-allocated bandwidth provided by the media director. Advantageously, in this matter, a scalable method is provided for determining whether to grant admission to calls onto an aggregate pipe while assuring the newly admitted call/session that it will receive required end-to-end bandwidth. The proposed method of call admission control improves the jitter and delay characteristics of voice flows. Additionally, the local media aggregation managers need not query the media director for available bandwidth upon initiation of every call/session. Rather, the local media aggregation managers may perform local call admission control without the overhead of interactions with the media director so long as they operate within the pre-allocated bandwidth they have been granted for a particular path.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a VoIP implementation, the present invention is equally applicable to various other network applications or services that are latency intensive (e.g., affected by jitter and/or transmission delays) and/or that require real-time performance, such as applications based on human interactions (e.g., collaborative software, online/Web collaboration, voice conferencing, and video conferencing), and real-time data communication and/or exchange, such as market data applications, financial transactions, and the like.

Additionally, for sake of brevity, embodiments of the present invention are described with reference to particular existing signaling, control, and communications protocol standards, such as International Telecommunication Union Telecommunication Standardization Section (ITU-T) Recommendation H.225.0 entitled "Call Signalling Protocols and Media Stream Packetization for Packet-based Multimedia Communication Systems," published February 1998 (hereinafter H.225.0); and ITU-T Recommendation H.245 entitled "Control Protocol for Multimedia Communication," published May 1999 (hereinafter H.245); ITU-T Recommendation H.323 entitled "Packet-based Multimedia Communications Systems," published September 1999 (hereinafter H.323), the present invention is equally applicable to various other signaling, control, and communications protocols. For example, Session Initiation Protocol (SIP) may be employed to create, modify, and terminate application sessions with one or more participants. SIP is described in M. Handley et al., "SIP: Session Initiation Protocol," RFC 2543, Network Working Group, March 1999, which is hereby incorporated by reference. Furthermore, it is contemplated that embodiments of the present invention will be applicable to various proprietary signaling and media transport protocols.

TERMINOLOGY

Brief definitions of terms used throughout this application are given below.

An "application" or "endpoint" generally refers to a software program that is designed to assist in the performance of a specific task, such as Internet telephony, online collaboration, or video conferencing.

An "application flow" generally refers to the data associated with an application session. An example of an application flow is a media stream, such as a continuous sequence of packetized voice and/or voice-band data transmitted over a network.

"Application session" generally refers to a session established and maintained between two or more end points or terminals. According to embodiments of the present invention, one or more application sessions may be multiplexed onto a path through a DiffServ network environment. In the context of VoIP, a call from one user community to another is an example of an application session.

The phrase "communication network" or term "network" generally refers to a group of interconnected devices capable of exchanging information. A communication network may be as few as several personal computers on a Local Area Network (LAN) or as large as the Internet, a worldwide network of computers. As used herein "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The terms "connected" or "coupled" and related terms are used in an operational sense and are not necessarily limited to a direct or physical connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrases, terms, and acronyms "media aggregation manager," "MAM," "media controller," and "MC" generally refer to one or more or a combination of physical and/or logical network devices, such as an edge device at the ingress/egress edges of a user community, or a group of one or more software processes running on a network device that provides application/protocol specific multiplexing/demultiplexing of media traffic over a pre-allocated path (potentially through one or more tunnels).

The phrase/acronym "media director"/"MD" generally refers to one or more or a combination of physical and/or logical network devices or a group of one or more software processes running on a network device that has a global view of the DiffServ network and provides core router visibility. According to one embodiment, the MD is separate and remote from MCs. However, in other embodiments, the MD functionality may be colocated with MC functionality.

The term "responsive" includes completely or partially responsive.

A "tag," in the context of the described embodiment, generally refers to information that is appended to application generated packets, such as Real-time Transport Protocol (RTP) packets or Real-time Transport Control Protocol (RTCP) packets, that allows the proxy endpoints of the communication session to transmit encapsulated packets to the appropriate remote application/endpoint (RA). According to one embodiment of the present invention, a tag includes address information, such as the destination network address of the terminal upon which the destination application/endpoint resides. When a media aggregation manager is employed in connection with a transport protocol and control protocol (such as RTP and RTCP) that use different channels or ports for control and data, control and data packets may be multiplexed onto the pre-established path by including protocol dependent control information. Then, the remote media aggregation manager may strip the tag from the encapsulated packet and determine the appropriate channel/port of the remote application/endpoint on which to forward the resulting packet based upon the additional protocol dependent control information within the tag. In this manner, two layers of multiplexing may be achieved, (1) a first layer that allows identification of the appropriate application at the remote media aggregation manager; and (2) a second layer that specifies a subclass/subprocess within an application.

A "terminal" generally refers to a LAN-based endpoint for media transmission, such as voice and/or voice-based data transmission. Terminals may be capable of executing one or more networked applications programs. In the context of VoIP, an example of a terminal would be a computer system running an Internet telephony application, such as CoolTalk or NetMeeting.

A "tunnel" generally refers to a logical transmission medium through which packets of one protocol encapsulated or wrapped in a packet of another protocol are transmitted via the protocol of the wrapper. According to one embodiment, voice and/or voice-band data packets are encrypted proximate to the source for secure transmission over one or more public internetworks, such as the Internet, and then decrypted proximate to the destination.

A "user community" generally refers to a group of users residing on a common network. For example, employees on an enterprise network at a given location or users of a particular Internet service provider (ISP) at a given location may represent a user community.

In the exemplary topology depicted in FIG. 1, media controller or media aggregation manager A ("MC-A") and media controller or media aggregation manager B ("MC-B") comprise edge boxes/session controllers that aggregate voice, video and/or data traffic for H323, SIP, and Skinny phones and endpoint units. The centralized media director (MD) provisions a path through the router topology between MC-A and MC-B.

When the MD is introduced into the network, it acts as a bandwidth broker and discovers the entire topology. The MD keeps track of the available bandwidth of PQ on every interface in the network. MC forwards its aggregate voice traffic through the PQ.

The MD performs Path Admission control and is the strict owner of bandwidth for the priority queue. The MCs request bandwidth from the MD. Since MD has visibility into the total available bandwidth in network, it has enough information to accept or deny the request. Once bandwidth is allocated to an MC for a path, the MC then keeps track of the available bandwidth in the path, to perform local Call admission control.

In this example, the route for the path is edge box MC-A, routers UT1, T1, T3, UT2 and edge box MC-B. The path is allocated a certain bandwidth, for example 500 Kb/s.

When MC-A gets an incoming voice call or request for a new session, it determines the aggregate path through which the call must be forwarded to the remote edge box. MC-A then determines if there is enough bandwidth available in the routers along the path to fit this call. This process (called Call Admission Control) validates that there is room to fit one session, the source MC marks all incoming packets from the session with a DiffServ marking appropriate to the nature of traffic, and forwards it to the remote MC. In the above case, if Phone A calls Phone B, Phone A's traffic is first sent to MC-A; which determines that it should be forwarded over the aggregate path to MC-B. MC-B then de-aggregates PhoneA's traffic and forwards it to PhoneB.

Necessary policies are configured into the routers so that the packets with the DiffServ marking are given the Expedited Forwarding Per-Hop-Behavior (PHB) treatment. Such packets are channeled into the priority queue, (PQ) so that voice flows do not suffer delays, jitters of best effort traffic.

According to one embodiment, the MC notifies the MD of any changes to bandwidth for a path. Requests for additional bandwidth from MCs may occur during path creation. Furthermore, such requests may be due to unpredicted call load volumes. Relinquishment of bandwidth may occur during path deletion and/or voluntary bandwidth relinquishment from an MC.

According to one embodiment, the MD maintains an up-to-date table of available bandwidth on every interface in the DiffServ network environment called an AvailableBandwidth table. For every bandwidth request from an MC for a path, the MD performs "Path admission control (PAC)." PAC verifies the AvailableBandwidthTable to ensure that for every interface in the path, there is enough available bandwidth to accommodate the bandwidth request. If there is, then the request is granted. If not, the request is denied. The MD then adjusts the ReservedBandwidth table to subtract the available bandwidth by the amount granted along all the interfaces in the path.

Once a portion of bandwidth on an interface is granted to a path, the MD will not allocate it for any other paths that are also provisioned over that interface.

Once the MC is granted a chunk of bandwidth, the MC is assured of the requested bandwidth in the path, end-to-end to the remote MC. For its part, the MC keeps track of the available bandwidth on its aggregate path. When MC gets an incoming call, or a new session, it computes the bandwidth requirements for the new call or session. The MC also knows the exact size of its aggregate path to the remote MC. MC performs Call Admission Control (CAC) locally for the request. It determines if there is room in the path for the requested bandwidth. If there is room, the new session is admitted into the path. The available bandwidth on the path is reduced by the bandwidth occupied by the session on the local MC.

Figure 8:
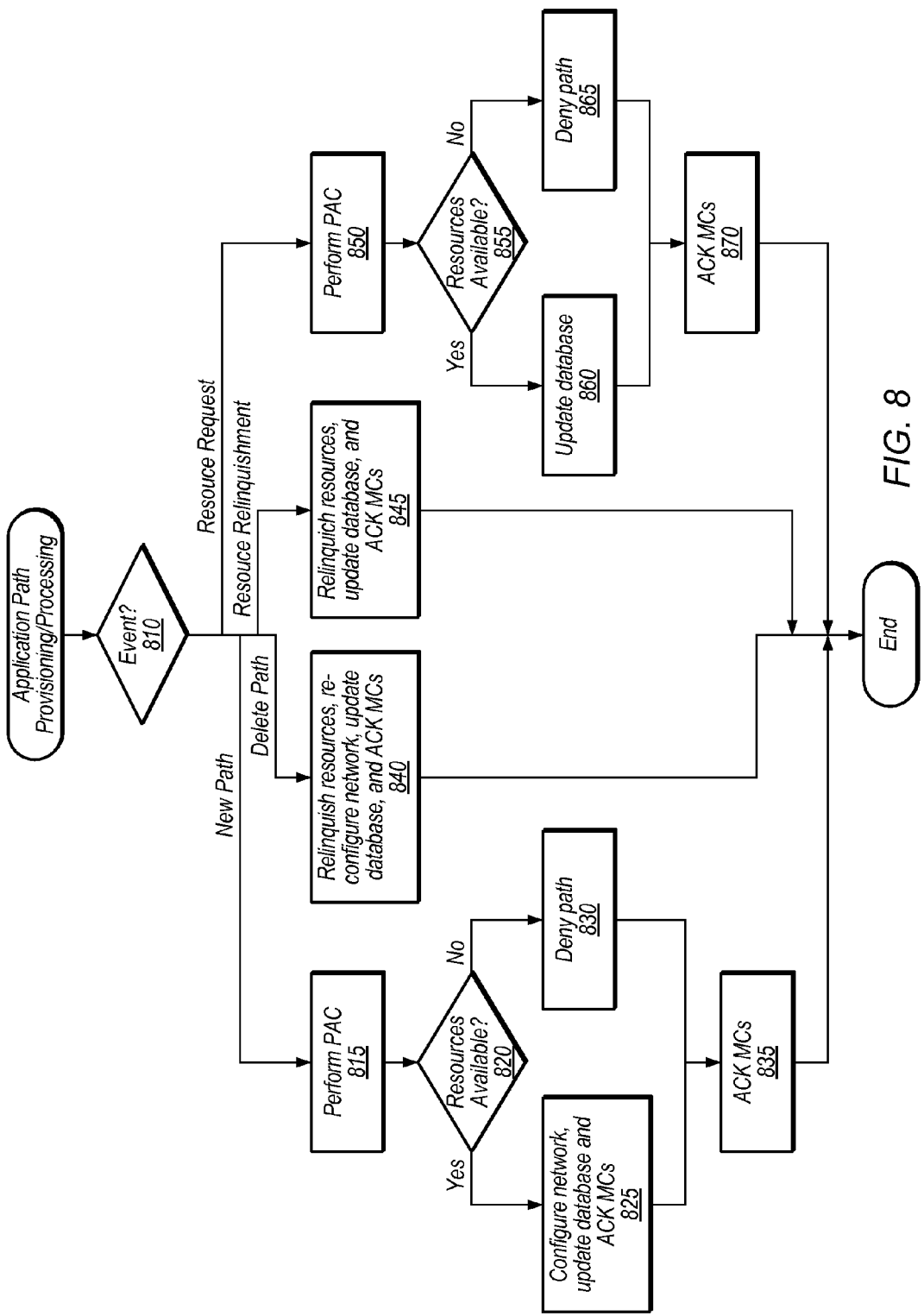
FIG. 8 is a simplified, high-level flow diagram illustrating application path provisioning/processing according to one embodiment of the present invention.

If the local MC determines that it needs more bandwidth on the path to the remote MC, it again requests the MD to readjust the bandwidth size of its path. The MD performs Path Admission Control and grants or denies the request (see e.g., FIG. 8).

While in some embodiments described herein, the media aggregation managers 110 and 120 are discussed as if they are autonomous network edge devices, according to various embodiments of the present invention some or all of the functionality of a media aggregation manager might be integrated with existing network devices, such as bridges, routers, switches, and the like.

Additionally, while the media director is discussed as if it were an autonomous network device, according to one embodiment of the present invention some or all of the functionality of a media director might be integrated within existing network devices or distributed among one or more media aggregation managers.

Furthermore, in some embodiments the determination regarding bandwidth requirements between the local and remote MCs is described as being performed by the local (or originating) MC; however, such determination may be performed on behalf of the local MC or by or on behalf of the remote MC in alternative embodiments.

Moreover, while according to one embodiment, Path Admission Control is performed by a centralized entity, e.g., a MD, in alternative embodiments the Path Admission Control functionality may be distributed. Similarly, while Call Admission Control is described above as being performed local to a call originating MC, in alternative embodiments, such Call Admission Control may be performed on behalf of the MC by the remote MC or by the MD, for example.

Network Device Overview

Figure 2:
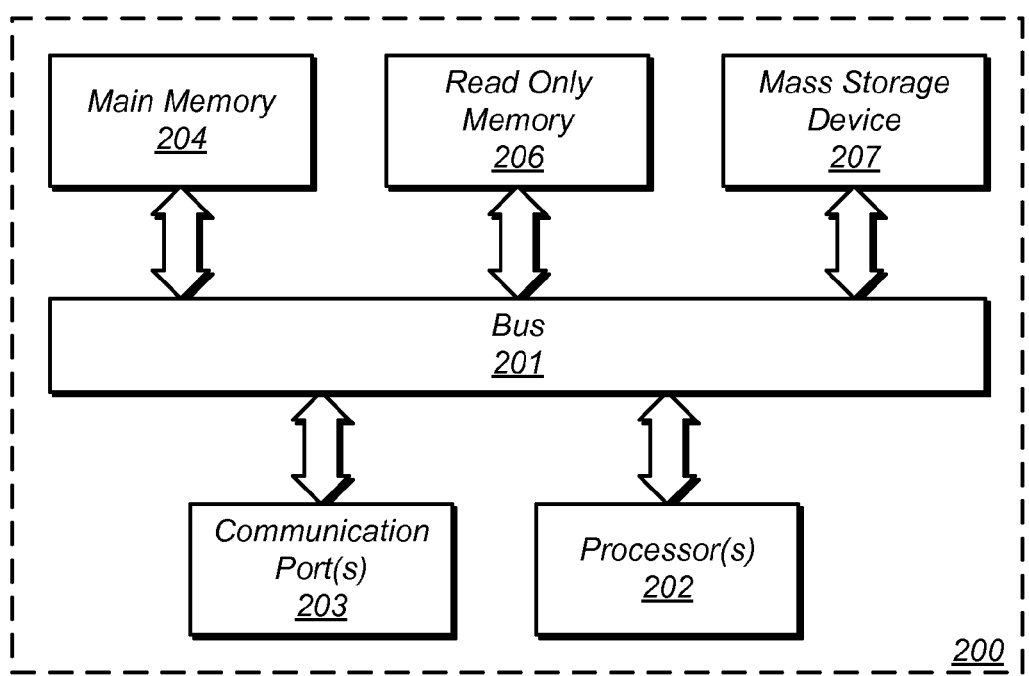
FIG. 2 is an example of a network device in which one embodiment of the present invention may be implemented.

An exemplary machine in the form of a network device 200, representing an exemplary media aggregation manager or media director, in which features of the present invention may be implemented will now be described with reference to FIG. 2. In this simplified example, the computer system 200 comprises a bus 201 or other communication means for communicating data and control information, and one or more processors 202, such as Intel® Itanium® or Itanium 2 processors or Sun® UltraSPARC-IIi® processors, coupled with bus 201.

Computer system 200 further comprises a random access memory (RAM) or other dynamic storage device (referred to as main memory 204), coupled to bus 201 for storing information and instructions to be executed by processor(s) 202. Main memory 204 also may be used for storing temporary variables or other intermediate information during execution of instructions by processor(s) 202.

Computer system 200 also comprises a read only memory (ROM) 206 and/or other static storage device coupled to bus 201 for storing static information and instructions for processor(s) 202.

A mass storage device 207, such as a magnetic disk or optical disc and its corresponding drive, may also be coupled to bus 201 for storing instructions and information.

One or more communication ports 203 may also be coupled to bus 201 for supporting network connections and communication of information to/from the computer system 200 by way of a communication network, such as a Local Area Network (LAN), Wide Area Network (WAN), the Internet, or PSTNs, for example. The communication ports 203 may include various combinations of well-known interfaces, such as one or more modems to provide dial up capability, one or more 10/100 Ethernet ports, one or more Gigabit Ethernet ports (fiber and/or copper), or other well-known network interfaces commonly used in internetwork environments. In any event, in this manner, the computer system 200 may be coupled to a number of other network devices, communication devices, clients, and/or servers via a conventional communication network infrastructure.

Optionally, operator and administrative interfaces (not shown), such as a display, keyboard, and a cursor control device, may also be coupled to bus 201 to support direct operator interaction with computer system 200. Other operator and administrative interfaces can be provided through network connections connected through communication ports 203.

Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 201 via corresponding drives, ports or slots.

Media Aggregation Manager

Figure 3:
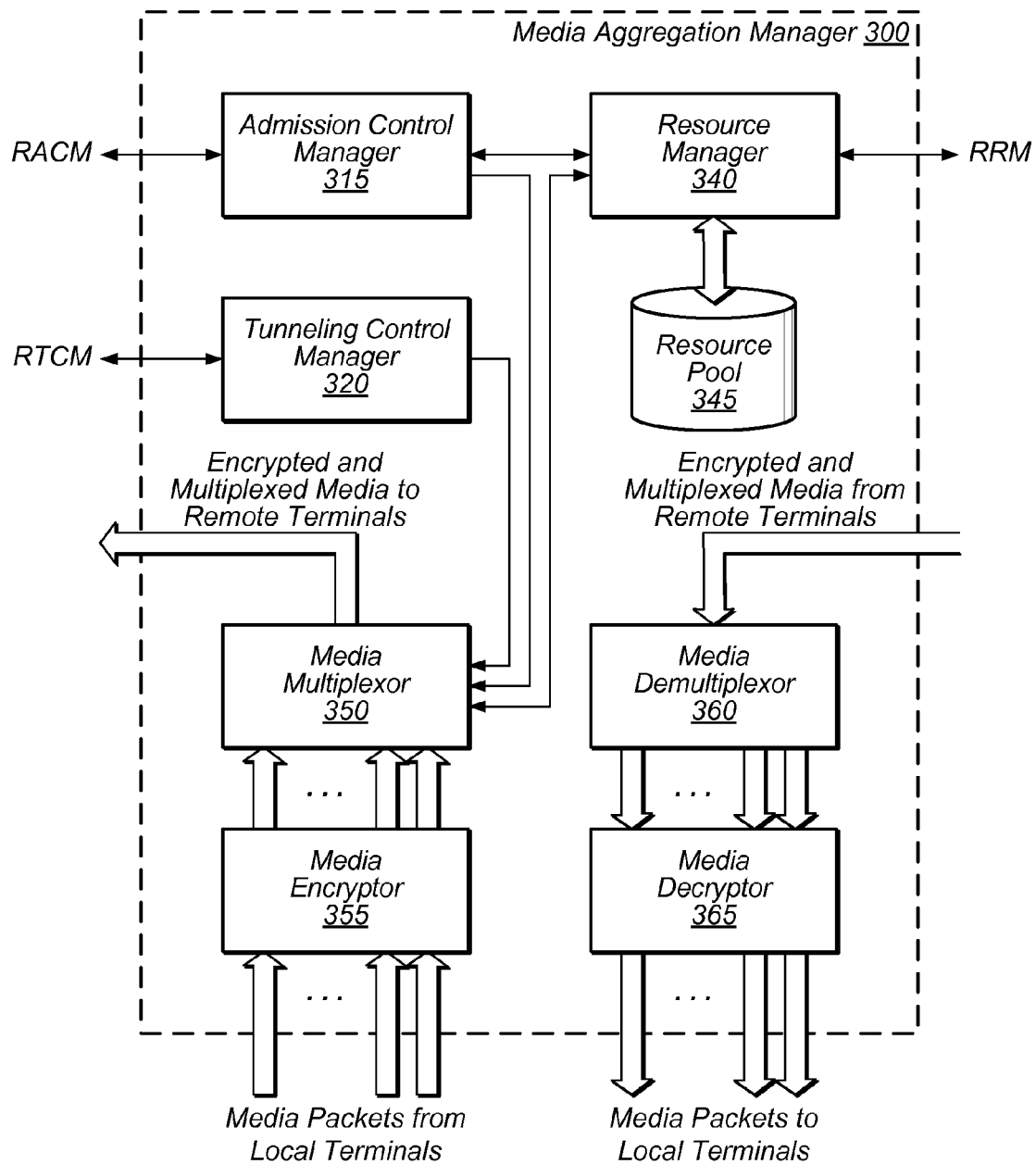
FIG. 3 is a high-level block diagram of a media aggregation manager according to one embodiment of the present invention.
Figure 4:
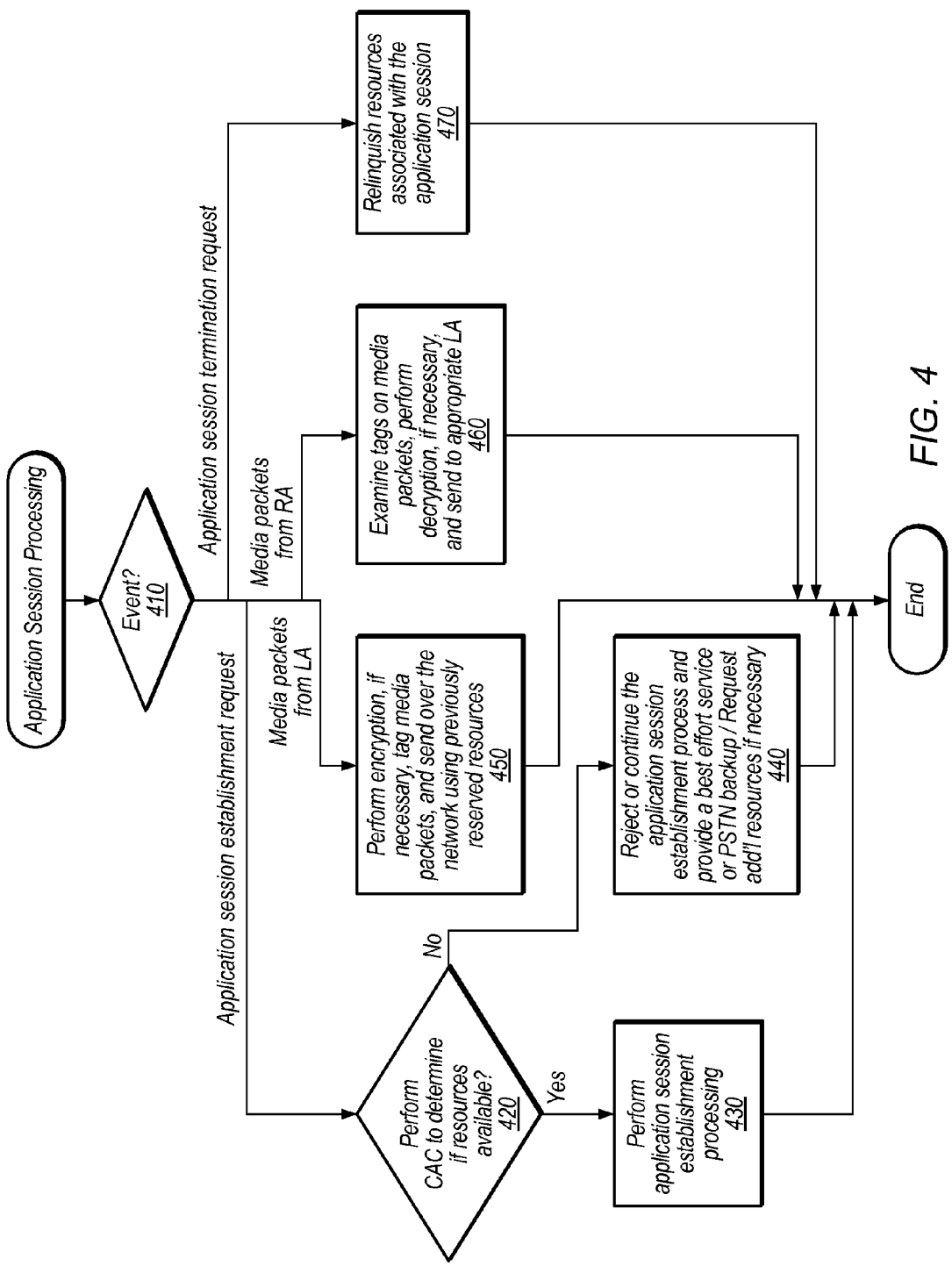
FIG. 4 is a simplified, high-level flow diagram illustrating application session processing according to one embodiment of the present invention.

FIG. 3 is a high-level block diagram of a media controller/media aggregation manager according to one embodiment of the present invention. By interconnecting a plurality of distributed media aggregation managers, such as media aggregation manger 300, an architecture is provided for multiplexing several application flows (e.g., VoIP calls) and optionally additionally selectively encrypting such flows over a pre-established path. In a VoIP environment, the logical positioning of the media aggregation managers 300 relative to the terminals enables encryption to be performed only on voice related packets rather than every packet that hits the router as would be the case in a RBE solution.

In the example depicted, the source media aggregation manager receives media packets from its local terminals and transmits encrypted multiplexed media to the destination aggregation manager. The destination aggregation manager receives the encrypted multiplexed media and routes media packets to the appropriate terminal(s) of its local terminals by performing demultiplexing and decryption.

In this example, the media aggregation manger 300 includes an application/protocol specific media multiplexor 350, an application/protocol specific media demultiplexor 360, a media encryptor 355, a media decryptor 365, an admission control manager 315, a tunneling control manager 320, a generic resource manager 340, and a resource pool 345. In a software implementation, instances of the media multiplexor 350, media demultiplexor 360, and admission control manager 315 may be created for each particular application/protocol needed to allow communications between terminals of the geographically diverse user communities. Importantly, it should be appreciated that the particular partitioning of functionality described with reference to this example is merely illustrative of one or many possible allocations of functionality.

According to the embodiment depicted, the resource manager 340 establishes and maintains one or more pre-established paths between the local media aggregation manager and one or more remote media aggregation managers. The resource manager 340 optionally interfaces with a centralized entity, e.g., the media director, to obtain pre-allocated bandwidth. The media director may also provide information relating to the characteristics and estimated amount of resources needed for the pre-allocated path. Alternatively, a network administrator may provide information to the resource manager 340 relating to desired characteristics of the pre-allocated path. The resource manager 340 also tracks active application sessions for each pre-established path and the current availability of resources for each path in the resource pool 345.

The tunneling control manager 320 interfaces with the media encryptor 350 and one or more other remote tunneling control managers (RTCMs) associated with other user communities to agree upon encryption, such as Message Digest 5 (MD5), RSA Data Encryption Standard (DES) or other encryption standard, key management, and/or a tunneling protocol to be employed for a particular application session, such as existing or future versions of the IP Security (IPSec) Protocol, generic routing encapsulation (GRE), Layer 2 Forwarding (L2F), Layer 2 Tunneling Protocol (L2TP), or the Point-to-Point Tunneling Protocol (PPTP).

The media encryptor 355 receives media packets from the local terminals (not shown) and selectively encrypts the media packets for exchange with the media decryptor 365 of the remote media aggregation manger as previously agreed upon by the participating tunneling control managers based upon the application session with which the media packets are associated. In this manner, security may be configured on an application session basis (e.g., a call-by-call basis).

The admission control manager 315 interfaces with local terminals (not shown) associated with a particular user community, the media multiplexor 350, the resource manager 340, and one or more other remote media aggregation managers associated with other user communities.

The media multiplexor 350 receives selectively encrypted media packets from the media encryptor 355 and appropriately translates/encapsulates the packets for communication with the media demultiplexor 360 of the remote media aggregation manger in accordance with the aggregation technique described further below. When application flows are established and terminated, the admission control manager 315 interfaces with the resource manager 340 to allocate and deallocate resources, respectively.

The media demultiplexor 360 interfaces with the media decryptor 365 to supply the media decryptor 365 with the selectively encrypted media packets by demultiplexing the respective application flows from the pre-established path. The media decryptor 365 then decrypts the media packets, if necessary, and forwards them to the appropriate local terminals (not shown).

The admission control manager 315 exchanges admission control signaling messages with remote admission control managers and configures the local application/endpoint (LA) to send media to transmitted to the local media aggregation manager after an application session has been established with a remote media aggregation manager. For VoIP using the H.323 protocol, the admission control manager 315 may include RAS, call control, and call signaling processing.

When application flows are established and terminated, the admission control manager 315 interfaces with the resource manager 340 to allocate and deallocate resources, respectively.

In operation, two resource managers cooperate to establish a path between a local media aggregation manager (LMAM) and a remote media aggregation manager (RMAM). The resource managers may interact with the media director to pre-allocate bandwidth sufficient to accommodate the anticipated load offered by applications that need to communicate over the path. Subsequently, a local media encryptor (LME) associated with the LMAM provides admission control for application flows between one or more terminals of the LMAM and the RMAM with the assistance of the local and remote admission control managers and the local and remote resource managers. If sufficient resources are available over the pre-established path, then the LME selectively encrypts the application flows and the local media multiplexor (LMM) multiplexes the application flows for transmission over the path. On the receiving end, the remote media demultiplexor (RMDX) demultiplexes the application flows and sends them to their intended destinations through the remote media decryptor (RMD) which performs any necessary decryption. The typical admission control manager 315 will be a player in the path of the application protocol for setting up the connection between two or more application endpoints; hence, it may be instrumented to modify the path of the media packets to flow through the LME, LMM, the remote media encryptor (RME), and the remote media multiplexor (RMM).

In brief, after an application session has been associated with the pre-established path, the application/endpoints may use a transport protocol and/or a control protocol, such as RTP and/or RTCP to exchange potentially encrypted media packets between them. The media packets may carry various types of real-time data, such as voice, voice-band data, video, multi-media, or other data for human interactions or collaboration. Media packets from a data source are optionally encrypted by the local media encryptor 355, tagged by the local media multiplexor 350, and sent over the pre-established path to one or more media demultiplexors 360 corresponding to the data destination. As illustrated below, the media demultiplexor 360 strips the tag before the media packets are forwarded, the media decryptor 360 performs decryption processing, and then the tag information is used to determine the ultimate destination of the data packet.

A specific example of the use of this architecture is in connection with the use of the H.323 protocol for VoIP calls. Typically, an H.323 Gatekeeper is used by endpoints to help in address resolution, admission control etc. So, for the H.323 protocol, the gatekeeper is a convenient place for the media multiplexor 350 and/or media encryptor 355 to reside.

Note that in this description, in order to facilitate explanation, the media aggregation manager 300 is generally discussed as if it is a single, independent network device or part of single network device. However, it is contemplated that the media aggregation manager 300 may actually comprise multiple physical and/or logical devices connected in a distributed architecture; and the various functions performed may actually be distributed among multiple of such physical and/or logical devices. Additionally, in alternative embodiments, the functions performed by the media aggregation manager 300 may be consolidated and/or distributed differently than as described. For example, any function can be implemented on any number of machines or on a single machine. Also, any process may be divided across multiple machines. Specifically, the media multiplexor 350 and the media encryptor 355 may be combined as a single functional unit or the multiplexing and encrypting processing may be performed in the opposite order than described above. Similarly, the media demultiplexor 360 and the media decryptor 365 may be combined as a single functional unit or the demultiplexing and decrypting processing may be performed in the opposite order than described above, e.g., encryption may be performed before or after multiplexing. Finally, encryption may be performed at various levels of the application flow. For example, encryption may be performed on the media and/or control information directly, the media and/or control packets, or on multiplexed media and/or control packets.

Sharing Pre-Allocated Bandwidth and a Pre-Established Path Through a DiffServ Network Environment In this example, it is assumed that a path through the DiffServ network environment has been previously established and the media aggregation managers have already requested bandwidth from the media director. The pre-allocated bandwidth preferably takes into consideration current network resources and estimated usage of network resources, such as bandwidth, based upon historical data. For example, the amount of pre-allocated resources may vary due to different loads being offered at different times of day and/or day of week.

Figure 5:
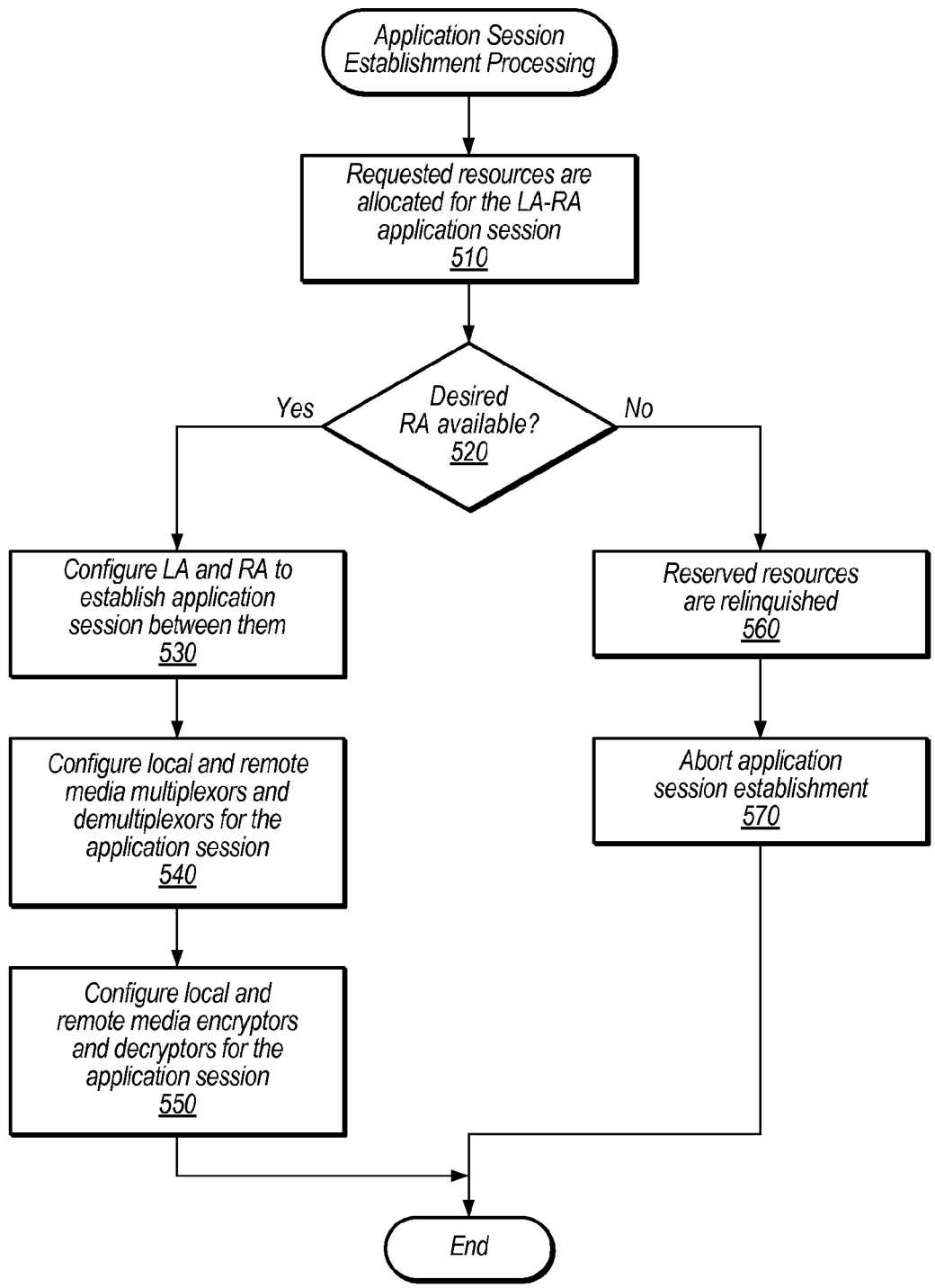
FIG. 5 is a simplified, high-level flow diagram illustrating application session establishment processing according to one embodiment of the present invention.

FIG. 5 is a simplified, high-level flow diagram illustrating application session establishment processing according to one embodiment of the present invention. In the present example, application session establishment processing begins with processing block 510. At processing block 510, the requested resources are allocated to the application session. According to one embodiment, the local resource manager 340 creates a new application session entry, in the resource pool 345, containing an indication of the resources granted to the application session.

At decision block 520, a determination is made whether the desired remote application/endpoint is available to participate in the application session. If so, processing proceeds to processing block 530; otherwise, processing branches to processing block 560.

Assuming the desired remote application/endpoint is available to participate in the application session, then at processing block 530, the local application/endpoint and the remote application/endpoint are configured to send media packets associated with the application session to the local and remote media multiplexors, respectively.

At processing block 540, the local and remote media multiplexors and demultiplexors are configured in accordance with the application session. For example, as described further below, a lookup table may be maintained by the media multiplexor 350 or media demultiplexor 360 to translate the source network address of the local application/endpoint to the destination network address of the remote application/endpoint.

Finally, at processing block 550, the local and remote media encryptors 355 and decryptors 365 are configured in accordance with the desired level of security for the application session. Exemplary standards-based encryption options include Message Digest 5 (MD5), RSA Data Encryption Standard (DES), and Triple DES encryption. Exemplary tunneling options include the IP Security (IPSec) Protocol, generic routing encapsulation (GRE), Layer 2 Forwarding (L2F), Layer 2 Tunneling Protocol (L2TP), or the Point-to-Point Tunneling Protocol (PPTP).

Figure 6:
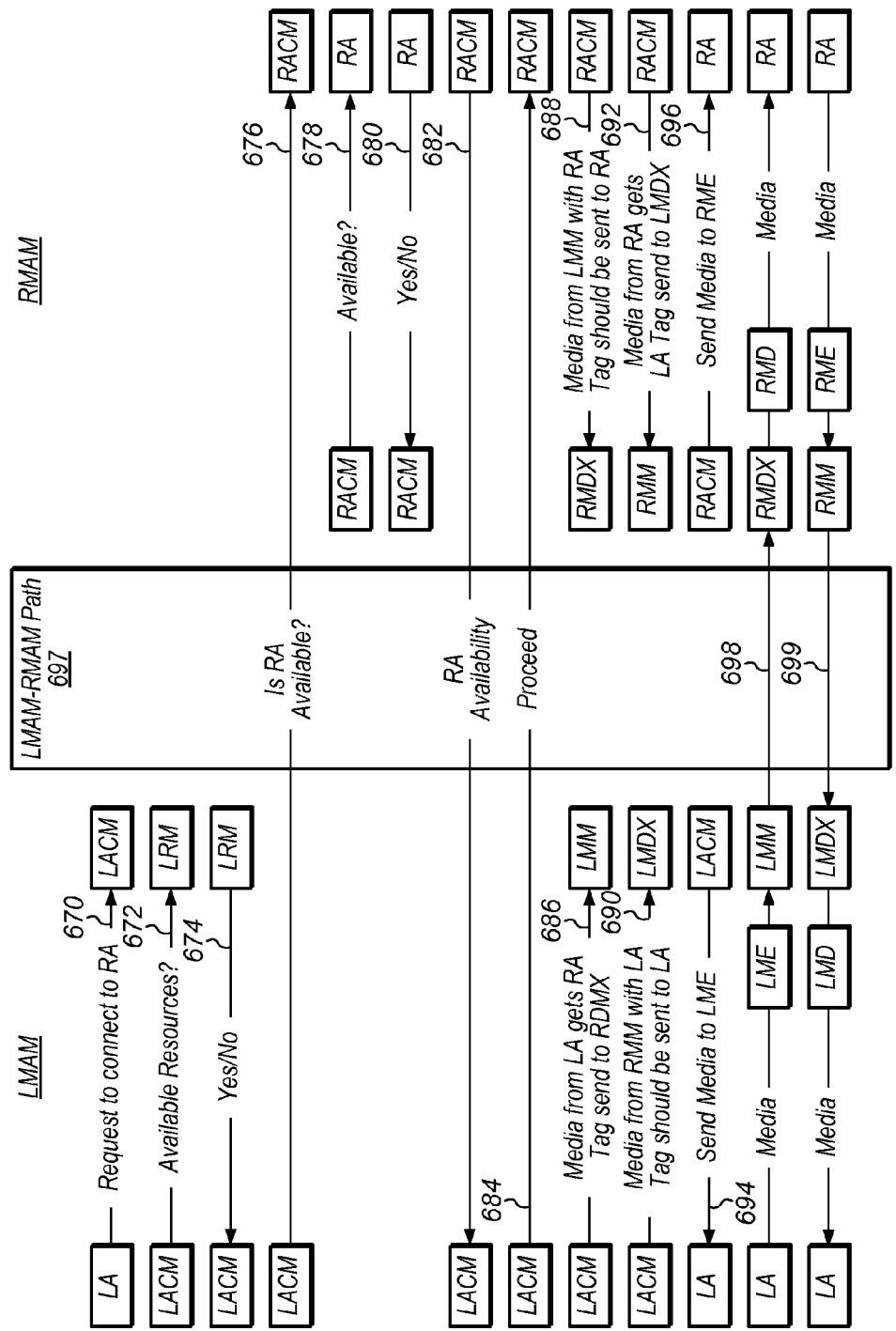
FIG. 6 illustrates interactions among local and remote media aggregation manager functional units according to one embodiment of the present invention.
Figure 7:
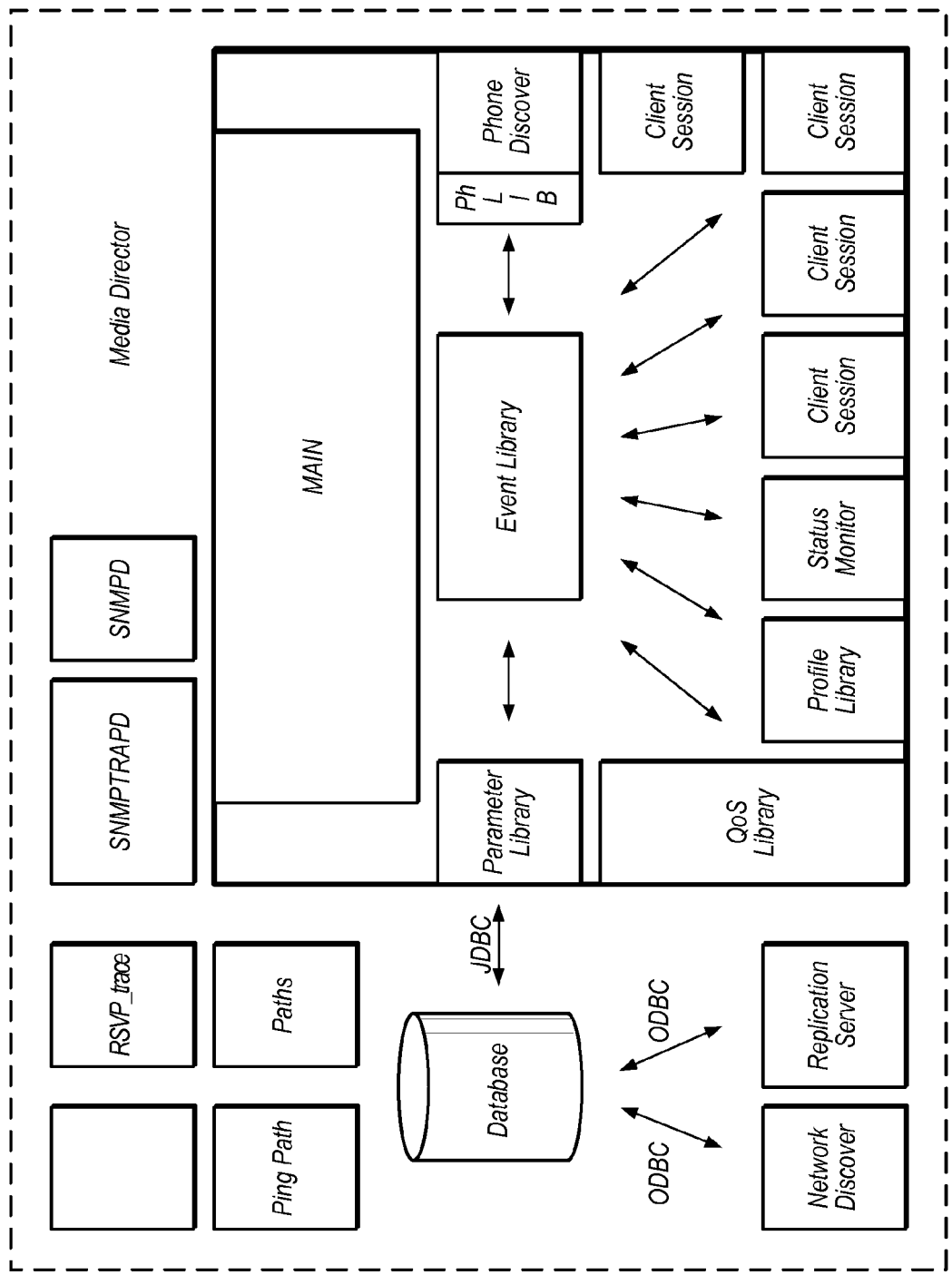
FIG. 7 is a high-level block diagram of a media director according to one embodiment of the present invention.

FIG. 6 illustrates interactions among local and remote media aggregation manager functional units according to one embodiment of the present invention. In general, the media aggregation managers abstract the true application session endpoints from each other and serve as proxies for their respective local applications/endpoints. The media aggregation managers accomplish this by intercepting messages originating from their respective local applications/endpoints and modifying the messages to make themselves appear as the actual application flow originators/recipients.

In this example, for simplicity, it is assumed that a single local application/endpoint (LA) is establishing an application session with a single remote application/endpoint (RA) over a pre-allocated path between a local media aggregation manager (LMAM) associated with the LA and a remote media aggregation manager (RMAM) associated with the RA.

The LA transmits a request to connect to the RA to the LMAM (670). The LACM inquires of the local resource manager (LRM) whether sufficient resources are currently available to accommodate the LA's request (672). The LRM indicates the availability or inavailability of available resources to the LACM (674).

Assuming sufficient resources are available in the pre-allocated bandwidth provided by the media director to accommodate the resources the LA needs for the requested connection to the RA, then the LACM asks the RACM if the RA is available (676). In response to the LACM's request, the RACM queries the RA to determine its present availability (678). The RA indicates whether or not it is currently available to participate in an application session (680).

Assuming the RA indicates that it is available, then the RACM communicates the RA's availability to the LACM (682). In response to the availability of the RA, the LACM directs the RACM to proceed with establishment of a connection between the LA and RA.

Having determined that a connection is feasible, the LACM and RACM proceed to configure their media multiplexors and media demultiplexors for the LA-RA connection. The LACM configures the local media multiplexor (LMM) to tag media originated from the LA for routing to the RA and to send the resulting encapsulated media packets to the remote media demultiplexor (RMDX) (686). The LACM further configures the local media demultiplexor (LMDX) to forward media packets that are received from the RMM and tagged as being associated with the LA-RA connection to the LA (690).

Similarly, the RACM configures the remote media demultiplexor (RMDX) to forward media packets that are received from the LMM and tagged as being associated with the LA-RA connection to the RA (688). The RACM also configures the remote media multiplexor (RMM) to tag media originated from the RA for routing to the LA and to send the resulting encapsulated media packets to the local media demultiplexor (LMDX) (692).

Once the media multiplexors and media demultiplexors have been appropriately configured for the LA-RA connection, the LACM and the RACM inform their application/endpoints to commence transmission of media to the LME and the RME, respectively 694 and 696. Thus, the media aggregation managers appear to their respective application/endpoints as the actual application flow originators/recipients and subsequently serve as proxies for their respective application/endpoints.

During media transmission between the LA and the RA 698 and 699, media packets originated by the LA are sent to the LME for optional encryption, then to the LMM, which encapsulates the media packets by appending a tag appropriate for the LA-RA connection and forwards the encapsulated packets over the path 697 to the RMDX. The RMDX determines the RA is the intended destination based upon the tag, removes the tag, and forwards the media packet to the RA via the RMD. Media packets originated by the RA are sent to the RME which performs encryption then to the RMM which encapsulates the media packets by appending a tag appropriate for the LA-RA connection and forwards the encapsulated packets over the pre-established path 697 to the LMDX. The LMDX determines the LA is the intended destination based upon the tag, removes the tag, and forwards the media packet to the LA via the local media decryptor (LMD).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   a first edge node requesting from a director node, an amount of bandwidth over a first of a plurality of paths in a network between the first edge node and a second edge node, wherein the director node is configured to maintain information indicative of bandwidth available along each of the plurality of paths;
   in response to the requested amount of bandwidth being available along the first path, the first edge node receiving, from the director node, an allocation of bandwidth as a real-time bandwidth pool associated with network resources in the first path;
   the first edge node receiving a connection request to establish a first real-time communication session between one of a first plurality of communication devices coupled to the first edge node and one of a second plurality of communication devices coupled to the second edge node; and
   in response to determining that network resources in the real-time bandwidth pool are available to permit communication over the first path, the first edge node responding to the connection request by allocating a portion of the real-time bandwidth pool to the first real-time communication session.

2. The method of claim 1,
   wherein the network is a Differentiated Services (DiffServ) network.

3. The method of claim 1,
   wherein the first real-time communication session corresponds to an Internet telephone call.

4. The method of claim 1, wherein the first edge node is configured to determine the amount of bandwidth to be requested based on an estimated current usage of network resources by active real-time communication sessions.

5. The method of claim 1, wherein the first edge node and the director node are distinct from one another.

6. The method of claim 1, further comprising:
   the first edge node determining that an insufficient amount of network resources is available in the real-time bandwidth pool; and
   in response to the determining, the first edge node requesting an additional amount of bandwidth over the first path.

7. The method of claim 6, further comprising:
   the first edge node receiving an allocation of the additional amount of bandwidth, wherein the additional amount of bandwidth is appended to the real-time bandwidth pool to form a new real-time bandwidth pool; and
   the first edge node allocating a portion of the new real-time bandwidth pool to a second real-time communication session.

8. The method of claim 1, further comprising:
   the first edge node multiplexing respective media streams for each of two or more real-time communication sessions into a multiplexed media stream; and
   the first edge node transmitting the multiplexed media stream to the second edge node over the first path.

9. A non-transitory computer readable storage medium having stored thereon instructions execution of which, by a first network device, cause the first network device to perform operations comprising:
   requesting, from a director device, an amount of bandwidth over a first of a plurality of paths in a network between the first network device and a second network device, wherein the director device is configured to maintain information indicative of bandwidth available along each of the plurality of paths;
   in response to the requested amount of bandwidth being available along the first path, receiving, from the director device, an allocation of bandwidth as a real-time bandwidth pool associated with network resources in the first path;
   receiving a request to initiate a first communication session between one of a first plurality of communication devices coupled to the first network device and one of a second plurality of communication devices coupled to the second network device; and
   in response to determining that sufficient network resources in the real-time bandwidth pool are available to permit the first communication session over the first path, the first network device allocating a portion of the real-time bandwidth pool to the first communication session.

10. A method comprising:
    a network director device receiving, from a first edge device, a first request for an amount of bandwidth over a first of a plurality of paths in a network between the first edge device and a second edge device; and
    in response to the requested amount of bandwidth being available along the first path, the network director device allocating, to the first edge device, available bandwidth as a real-time bandwidth pool associated with network resources in the first path;
    wherein the first edge device is configured to allocate portions of the real-time bandwidth pool to ones of a plurality of real-time communication sessions, wherein each of the plurality of real-time communication sessions is between one of a first plurality of communication devices coupled to the first edge device and one of a second plurality of communication devices coupled to the second edge device, wherein allocating the portions of the real-time bandwidth pool permits the plurality of real-time communication sessions to communicate via the first path.

11. The method of claim 10, further comprising:
    the network director device maintaining information indicative of bandwidth available along each of the plurality of paths in the network.

12. The method of claim 10, further comprising:
    the network director device receiving a second request from the first edge device for an additional amount of bandwidth;
    wherein the second request is generated in response to the first edge device determining that the real-time bandwidth pool has an insufficient amount of available bandwidth.

13. The method of claim 12, further comprising:
    in response to the requested additional amount of bandwidth being available along the first path, the network director device allocating the additional amount of bandwidth to the real-time bandwidth pool such that the additional amount of bandwidth is appended to the real-time bandwidth pool to form a new real-time bandwidth pool;

wherein the first edge device is configured to allocate portions of the new real-time bandwidth pool to ones of the plurality of real-time communication sessions.

14. The method of claim 10, wherein the network resources include, along the first path, one or more network devices selected from the group consisting of: bridges, routers, switches.

15. The method of claim 10, further comprising:
the network director device receiving a second request, from the first edge device, for an additional amount of bandwidth over the first path; and
in response to the requested amount of bandwidth not being available, the network director device denying the second request.

16. The method of claim 10,
wherein the plurality of real-time communication sessions include an internet telephony session.

17. The method of claim 16,
wherein the first edge device is configured to de-allocate any bandwidth allocated to the internet telephony session upon termination of the internet telephony session.

18. A media director device configured to:
receive, from a first edge device coupled to a first plurality of communication devices, a first request for an amount of bandwidth over a first of a plurality of paths between the first edge device and a second edge device, wherein the second edge device is coupled to a second plurality of communication devices; and
allocate, in response to the requested amount of bandwidth being available along the first path, the requested bandwidth to the first edge device as a bandwidth pool associated with network resources in the first path, the first edge device being configured to receive a request to establish a first communication session between one of the first plurality of communication devices and one of the second plurality of communication devices, and in response to determining that network resources in the bandwidth pool are available to permit communication over the first path, allocate a portion of the bandwidth pool to the first communication session.

19. The media director device of claim 18, wherein the media director device is further configured to:
maintain information indicative of one or more allocations and/or de-allocations of the bandwidth pool by the first edge device.

20. The media director device of claim 18, the first edge device being further configured to encrypt data packets of the first communication session, and transmit the encrypted data packets to the second edge device via the first path.

21. The media director device of claim 18, wherein the media director device is further configured to:
receive, from the first edge device, a second request for an amount of bandwidth over a second of the plurality of paths; and
in response to the second requested amount of bandwidth being available along the second path, allocate available bandwidth to the first edge device as a second bandwidth pool associated with network resources in the second path;
wherein the first edge device is further configured to allocate a portion of the second bandwidth pool to a second communication session, wherein the second communication session is over the second path and is between one of the first plurality of communication devices and one of the second plurality of communication devices.

22. The media director device of claim 18, the first edge device being further configured to determine the amount of bandwidth to be requested based on an anticipated load created by the first plurality of communication devices.

23. The media director device of claim 18, the first edge device being further configured to serve as a proxy for the first plurality of communication devices by intercepting one or more messages of the plurality of communication sessions and modifying the intercepted messages to indicate that the first edge device is an originator of the modified messages.

24. The media director device of claim 18,
wherein the first communication session is an internet telephone call.

25. The media director device of claim 18,
wherein the first edge device is further configured to de-allocate any bandwidth allocated to the first communication session upon termination of the first communication session.

26. A non-transitory computer readable storage medium having stored thereon instructions execution of which, by a network director device, cause the network director device to perform operations comprising:
receiving, from a first media aggregation device, a request for an amount of bandwidth over a first of a plurality of paths on a network between the first media aggregation device and a second media aggregation device; and
in response to the requested amount of bandwidth being available along the first path, allocating bandwidth to the first media aggregation device as a bandwidth pool associated with network resources in the first path;
wherein the first media aggregation device is configured to allocate a portion of the bandwidth pool to a plurality of real-time communication sessions to permit communication via the first path, wherein each of the real-time communication sessions is between one of a first plurality of communication devices coupled to the first media aggregation device and one of a second plurality of communication devices coupled to the second media aggregation device.

27. An apparatus comprising:
a first network aggregation device configured to couple to a plurality of communication devices and to a network having a plurality of paths between the first network aggregation device and a second network aggregation device, wherein the first network aggregation device is configured to make a request to a director device for a first bandwidth pool, wherein the request is for a communication session via the first and second network aggregation devices over a first of the plurality of paths;
wherein the director device is configured to perform global path admission control by allocating the first bandwidth pool to the first network aggregation device; and
wherein the first network aggregation device is configured to perform local call admission control by allocating portions of the first bandwidth pool to a plurality of communication sessions established over the first path, wherein each of the plurality of communication sessions is between a communication device coupled to the first network aggregation device and a communication device coupled to the second network aggregation device.

28. The apparatus of claim 27, wherein the network is a Differentiated Services (DiffServ) network, and wherein each of the plurality of communication sessions corresponds to an Internet telephone call.

29. An apparatus comprising:
a network director device configured to receive a request to allocate a real-time bandwidth pool to be used between first and second devices in a network, wherein the network director device is configured to allocate the real-time bandwidth pool in response to the request, and wherein the real-time bandwidth pool corresponds to network resources associated with a first of a plurality of paths between the first and second devices;

wherein the first device is configured to respond to a request to establish, via the first path, an Internet telephony session between a first telephony device coupled to the first device and a second telephony device coupled to the second device.

30. The apparatus of claim 29, wherein the network is a Differentiated Services (DiffServ) network.

31. An apparatus comprising:

means for requesting from a director node an amount of bandwidth over a first of a plurality of paths in a network between the apparatus and an edge node, wherein the director node is configured to maintain information indicative of bandwidth available along each of the plurality of paths, and receiving from the director node, in response to the requested amount of bandwidth being available along the first path, an allocation of bandwidth as a real-time bandwidth pool associated with network resources in the first path; and means for receiving a connection request to establish a first real-time communication session between one of a first plurality of communication devices coupled to the apparatus and one of a second plurality of communication devices coupled to the edge node, and responding to the connection request, in response to the network resources in the real-time bandwidth pool to permit communication over the first path having been determined to be available, by allocating a portion of the real-time bandwidth pool to the first real-time communication session.

32. The apparatus of claim 31, wherein the means for requesting further comprises means for determining the amount of bandwidth to be requested based on an estimated current usage of network resources by active real-time communication sessions.

33. The apparatus of claim 31, wherein the apparatus and the director node are distinct from one another.

* * * * *

UNITED STATES PATENT AND TRADEMARK OFFICE
CERTIFICATE OF CORRECTION

| | | |
|---|---|---|
| PATENT NO. | : 7,774,468 B1 | Page 1 of 1 |
| APPLICATION NO. | : 11/038445 | |
| DATED | : August 10, 2010 | |
| INVENTOR(S) | : Siddhartha Nag | |

It is certified that error appears in the above-identified patent and that said Letters Patent is hereby corrected as shown below:

In column 13, line 12, in claim 1, after "requesting" insert -- , --.

Signed and Sealed this
Twenty-eighth Day of December, 2010

David J. Kappos
*Director of the United States Patent and Trademark Office*